US006720504B2

(12) United States Patent
Nishimoto et al.

(10) Patent No.: US 6,720,504 B2
(45) Date of Patent: Apr. 13, 2004

(54) MULTI-OPERATIONAL ELECTRONIC DEVICE

(75) Inventors: Takumi Nishimoto, Okayama (JP); Jun Sugahara, Okayama (JP); Jun Sato, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/378,914

(22) Filed: Mar. 5, 2003

(65) Prior Publication Data

US 2004/0003985 A1 Jan. 8, 2004

(30) Foreign Application Priority Data

Mar. 7, 2002 (JP) ....................................... 2002-061441

(51) Int. Cl.[7] .......................... H01H 9/00; H01H 19/54; H01H 13/50; H01H 25/00; F16D 3/00

(52) U.S. Cl. ........................... 200/4; 200/1 R; 200/1 B; 200/5 R; 200/6 A; 200/11 R; 200/11 DA; 200/18; 464/185

(58) Field of Search ................................. 200/1 R, 1 B, 200/4, 5 R, 5 A, 6 R, 6 A, 11 R, 11 DA, 11 G, 11 J, 11 K, 11 TW, 17 R, 18, 329–345, 520–536, 553–572; 464/185

(56) References Cited

U.S. PATENT DOCUMENTS

| | | | | | |
|---|---|---|---|---|---|
| 5,705,778 | A | * | 1/1998 | Matsui et al. | 200/11 R |
| 5,847,335 | A | * | 12/1998 | Sugahara et al. | 200/4 |
| 5,952,628 | A | * | 9/1999 | Sato et al. | 200/4 |
| 5,959,267 | A | * | 9/1999 | Kawasaki et al. | 200/4 |
| 6,124,555 | A | * | 9/2000 | Isikawa | 200/4 |
| 6,329,898 | B1 | * | 12/2001 | Mizobuchi | 200/11 J |
| 6,396,006 | B1 | * | 5/2002 | Yokoji et al. | 200/4 |

FOREIGN PATENT DOCUMENTS

| | | |
|---|---|---|
| JP | 10-241501 | 9/1998 |

* cited by examiner

*Primary Examiner*—James R. Scott
(74) *Attorney, Agent, or Firm*—Wenderoth, Lind & Ponack, L.L.P.

(57) ABSTRACT

In a multi-operational electronic device of the present invention, a first switch, which operates when an operating lever is tilted, is so configured that a circular domelike resilient movable contact large enough to cover a plurality of first fixed contacts is partially turned inside out. A connecting part connects an outer cylinder holding a rotary resilient contact, which effects generation of a rotary signal, with an inner cylinder fixed to an operating shaft so that the outer and inner cylinders move with each other in a rotating direction to generate the electric signal and contract vertically to press a central switch.

5 Claims, 9 Drawing Sheets

MULTI-OPERATIONAL ELECTRONIC DEVICE

BACKGROUND OF THE INVENTION

1. Field of the Invention

The present invention relates to a multi-operational electronic device, which is used mainly in centralized control systems of various electronic apparatuses or others and driven by tilting, rotating and pressing its operating lever.

2. Background Art

Conventionally known multi-operational electronic devices include a multi-operational electronic device with push switches. This device is disclosed in Japanese Patent Unexamined Publication No. H10-241501 and is described hereinafter with reference to FIGS. 8–11.

FIG. 8 is a perspective view of the conventional multi-operational electronic device with the push switches. FIG. 9 is a sectional view taken along line 9—9 in FIG. 8, and FIG. 10 is an exploded perspective view of the same multi-operational electronic device.

As shown in FIGS. 8–10, inverted-U-shaped metal cover 1, quadrangular frame 2 and fixed-contact board 3 cooperatively form a box-like casing, which has circular opening 1A in the center of its upper surface. Fixed-contact board 3, positioned at a lower part of the box-like casing, has push switch 7A at its center, and a plurality of push switches 7B, 7C, 7D, 7E arranged around push switch 7A, and these push switches 7A–7E each operate when pressed downward. The box-like casing includes upwardly projecting resilient fixed contacts 8.

Rotary member 9 is rotatably held by intermediate wall 4 of the box-like casing and holds contact plate 10 functioning as a movable contact corresponding to resilient fixed contacts 8.

Operating member 12 is constructed of polygonal ball-like member 12A, which is positioned at a lower end of operating member 12 and polygonal in horizontal section, and cylindrical operating lever 12B extending upward.

Polygonal ball-like member 12A is engaged in polygonal through-hole 9A defined in the center of rotary member 9 so as to be tiltable and vertically movable independently of rotary member 9 and to rotate with rotary member 9 and is in contact with central push switch 7A at its lower surface. Operating lever 12B projects from circular opening 1A in the upper surface of the box-like casing through central circular hole 13A of drive member 13.

Drive member 13 is a substantially polygonal plate and has domelike projection 13B in the center of its upper surface. This projection 13B is in contact with the box-like casing at circular opening 1A so as to be turnable and tiltable. Operating lever 12B of operating member 12 engages through central circular hole 13A so as to be rotatable and vertically movable.

Drive member 13 also has projections 14A, 14B, 14C, 14D extending from its lower surface and contacting respective outer push switches 7B, 7C, 7D, 7E.

Click spring 11 provides a click feel during rotation.

A description is hereinafter provided of an operation of the multi-operational electronic device having the above structure. When operating lever 12B is tilted to the right as indicated by arrow X in FIGS. 8 and 9 by application of lateral pushing force, operating member 12 turns to the right on its polygonal ball-like member 12A, as shown in FIG. 11.

Accordingly, drive member 13 engaging with an intermediate portion of operating lever 12B tilts in direction XI, whereby its projection 14A located in direction XI presses outer push switch 7B downward, effecting operation of this push switch 7B.

When operating lever 12B is released from the lateral pushing force, push switch 7B pushes projection 14A or drive member 13 back from beneath due to its resilient restoring force. Consequently, operating member 12 returns to its original neutral position shown in FIG. 9.

When operating lever 12B is rotated so that operating member 12 rotates while being held in the neutral position, rotary member 9 engaging with polygonal ball-like member 12A of operating member 12 to rotate with this ball-like member 12A rotates with drive member 13 staying still. Accordingly, resilient fixed contacts 8 slide resiliently on contact plate 10 positioned at a lower surface of rotary member 9, thereby producing an electric signal.

When operating lever 12B is pressed downward as indicated by arrow V in FIGS. 8 and 9 by application of downward pushing force, with drive member 13 and rotary member 9 staying still, polygonal ball-like member 12A at the lower end of operating member 12 presses central push switch 7A downward, whereby this push switch 7A is operated.

In the conventional multi-operational electronic device described above, polygonal ball-like member 12A of operating member 12 has a slight clearance where this ball-like member 12A is engaged in polygonal through-hole 9A of rotary member 9 in order not to transmit the vertical movement of operating member 12 to rotary member 9 when central push switch 7A is operated at the press of operating lever 12B.

The clearance at the above-mentioned engagement, however, provides looseness in the rotating direction when rotary member 9 is rotated through the rotation of operating lever 12B of operating member 12 for generation of the electric signal. Thus, there has been a problem that the clearance has given a feel of backlash to a hand of a user, particularly when the rotating direction is reversed.

Also, there has been a problem that the multi-operational electronic device has, as a whole, the increased number of elements, which has increased cost because outer push switches 7B, 7C, 7D, 7E, are arranged as discrete, independent switches on fixed-contact board 3 of the box-like casing.

SUMMARY OF THE INVENTION

A multi-operational electronic device of the present invention includes:

(a) a first switch including:
  - first fixed contacts arranged in a circle at established angular intervals on an inner surface of a first contact board; and
  - a resilient movable contact having a circular domelike shape large enough to cover all of the first fixed contacts across an established space and a through-hole in a center of the resilient movable contact, the resilient movable contact made of resilient sheet metal;

(b) a first casing including a circular opening in a center of an upper surface of the first casing;

(c) a first drive member stored in the first casing, the first drive member including: a turnable and tiltable domelike part extending along a border of an upper surface of the first drive member and contacting the first casing about the circular opening; a central hole through which an operating shaft including an operating lever at an upper part of the operating shaft is engaged to move vertically and rotate; and a specified projection provided on a lower surface of the first drive member and contacting an upper surface of the resilient movable contact in a position corresponding to the first fixed contacts in the first casing;

(d) a second casing placed below the first casing concentrically with the first casing and coupled to the first casing through a through-hole of the first casing, the second casing including: a central switch, which operates when pressed against a central part of an inner surface of a second contact board serving as a bottom of the second casing; and a second fixed contact extending along a circle surrounding the central switch; and (e) a second drive member stored in the second casing, the second drive member including: a rotatable outer cylinder vertically supported and having, on a lower surface of the outer cylinder, a rotary movable contact, which engages with the second fixed contact to generate an electric signal for a rotary signal generator; an inner cylinder fixed to a lower part of the operating shaft passing through the through-hole of the resilient movable contact of the first switch; and a connecting part connecting the outer and inner cylinders to allow the outer and inner cylinders to move with each other in a rotating direction and to expand and contract vertically, the outer and inner cylinders and the connecting part being integrally formed of elastic resin.

DETAILED DESCRIPTION OF THE INVENTION

An exemplary embodiment of the present invention is demonstrated hereinafter with reference to FIGS. 1–7.

Figure 1:
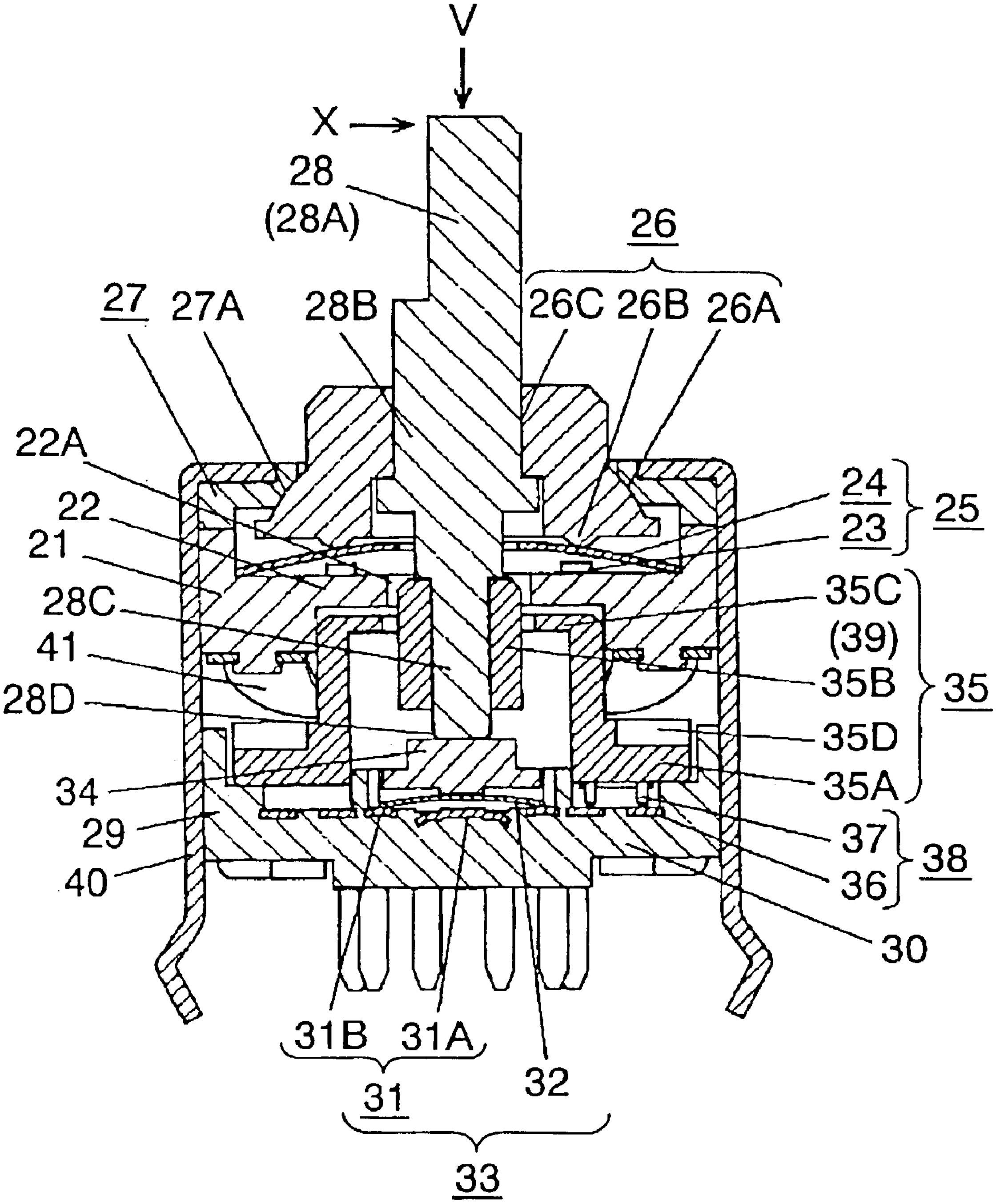
FIG. 1 is a sectional front view of a multi-operational electronic device accordance with an exemplary embodiment of the present invention.
Figure 2:
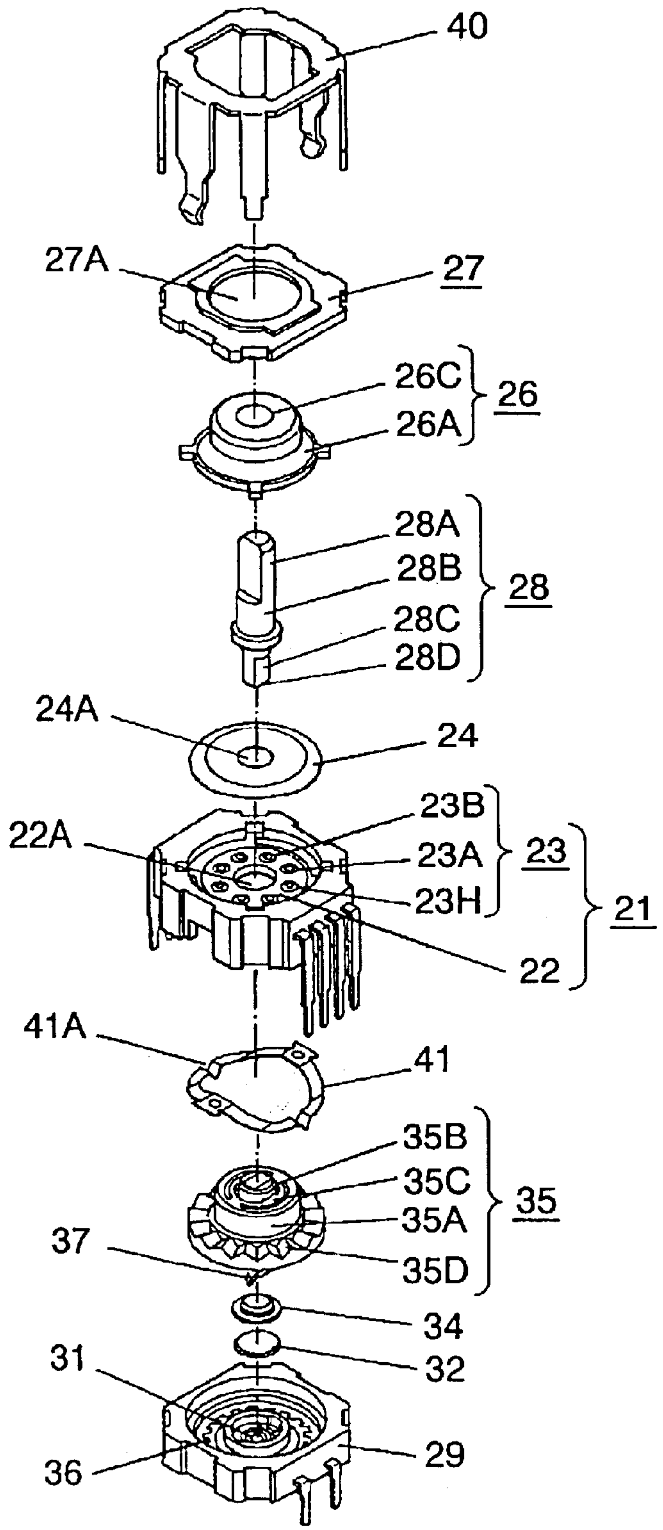
FIG. 2 is an exploded perspective view of the multi-operational electronic device in accordance with the embodiment.

FIGS. 1 and 2 are a sectional front view and an exploded perspective view, respectively, of a multi-operational electronic device in accordance with the exemplary embodiment.

In FIGS. 1 and 2, first casing 21 is made of resin and includes, at its bottom, first contact board 22. This first contact board 22 has, on its inner surface, eight first fixed contacts 23 (23A, 23B, 23C, 23D, 23E, 23F, 23G, 23H) that are arranged in a circle at equal angular intervals and connected to respective terminals. Resilient movable contact 24 formed of resilient sheet metal has a circular domelike shape large enough to cover all those eight first fixed contacts 23 across an established space, has through-hole 24A at its center and is concentric with the arrangement of first fixed contacts 23. First fixed contacts 23 and resilient movable contact 24 cooperatively form first switch 25.

First drive member 26 is placed on resilient movable contact 24 of first switch 25 and includes domelike part 26A extending along a border of its upper surface, and ring-shaped projection 26B on its lower surface. Domelike part 26A contacts cover plate 27, which covers an upper opening of first casing 21, in circular opening 27A, defined in the center of cover plate 27, so as to be turnable and tiltable. Projection 26B has the same radius as the arrangement of first fixed contacts 23 of first switch 25 and maintains its neutral position in contact with an upper surface of domelike resilient movable contact 24.

Cylinder 28B of operating shaft 28 is engaged in central hole 26C of first drive member 26 so as to be rotatable and vertically movable. Operating lever 28A projects upward from cylinder 28B and is in an erect, neutral position under normal conditions.

Second casing 29 is placed below first casing 21 concentrically with first casing 21, is coupled to first casing 21 through through-hole 22A of first casing 21 and includes, at its bottom, second contact board 30. This second contact board 30 has, in the center of its inner surface, central switch 33 including fixed contact 31 and small-diameter circular domelike movable contact 32 and also has second fixed contact 36 in the shape of a circular toothed comb extending along a circle surrounding central switch 33. Second casing 29 is provided with, at its periphery, terminals connected to fixed contact 31 and second fixed contact 36, respectively.

In central switch 33, fixed contact 31 includes central fixed contact 31A and outer fixed contact 31B. A central portion of a lower surface of movable contact 32 made of resilient sheet metal faces central fixed contact 31A across an established space, while a border of the lower surface of this movable contact 32 is in contact with outer fixed contact 31B.

Push member 34 is mounted on the central portion of an upper surface of movable contact 32 of central switch 33 and is in contact with lower end 28D of operating shaft 28 protruding downward through through-hole 22A of first casing 21.

Second drive member 35 is made of elastic resin, such as a thermoplastic elastomer, and is stored in second casing 29. This second drive member 35 is constructed of outer cylinder 35A, inner cylinder 35B and connecting part 35C. Outer cylinder 35A is vertically supported between a lower surface of first casing 21 and the bottom of second casing 29 so as to be rotatable. Non-cylindrical part 28C positioned at a lower part of operating shaft 28 is fixed into inner cylinder 35B by press fitting so as not to rattle. Connecting part 35C connects outer cylinder 35A and inner cylinder 35B to allow outer and inner cylinders 35A, 35B to move with each other in a rotating direction and to expand and contract vertically.

Figure 3:
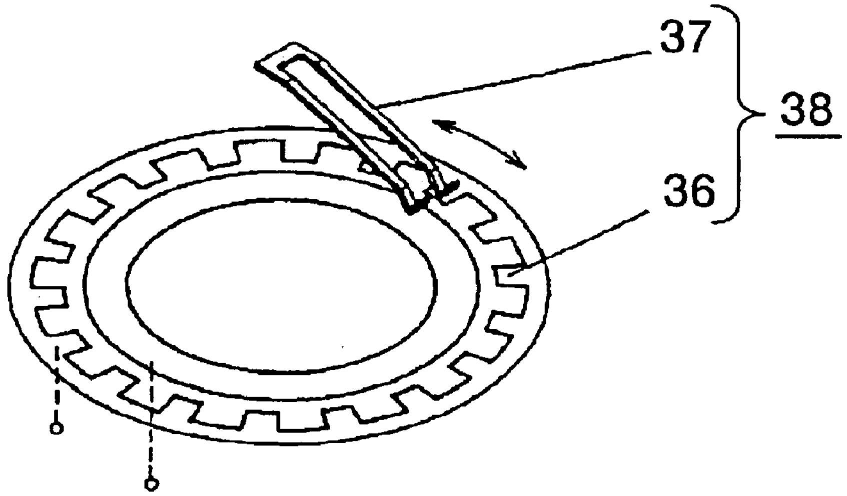
FIG. 3 is a conceptual view of a rotary signal generator of the multi-operational electronic device in accordance with the embodiment.
Figure 4:
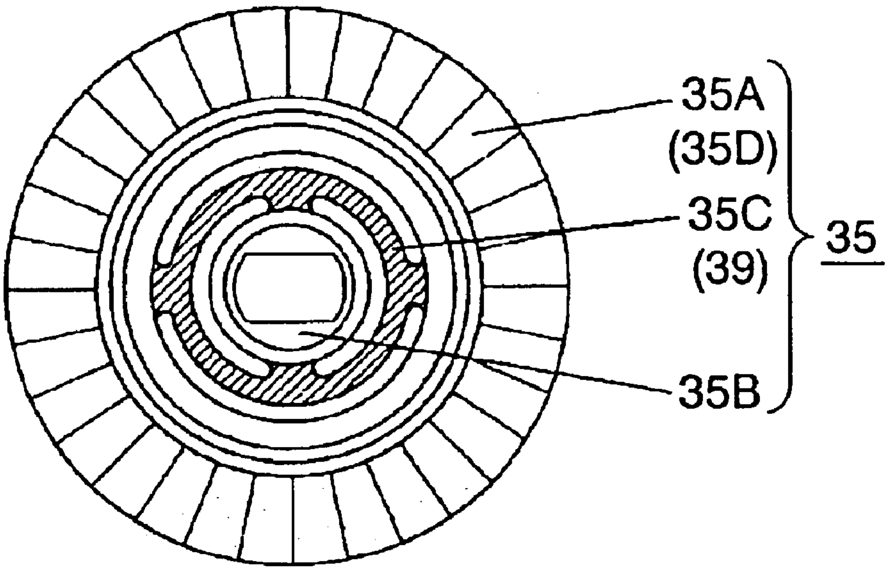
FIG. 4 is a plan view of a second drive member, which is an essential part of the multi-operational electronic device in accordance with the embodiment.

Rotary resilient contact 37, functioning as a rotary movable contact, is held at a lower surface of outer cylinder 35A and, as shown in FIG. 3, engages with circular toothed-comb-shaped second fixed contact 36 provided on the inner bottom surface of second casing 29, thus forming rotary encoder (rotary signal generator) 38 to generate a pulse signal (rotary signal).

Connecting part 35C and outer and inner cylinders 35A, 35B are integrally formed of resin so that connecting part 35C has a gimbal structure. Specifically, as hatched in FIG. 4, narrow-bridge ring 39 disposed concentrically with outer and inner cylinders 35A, 35B connects with outer cylinder 35A at two parts orthogonal to an inner periphery of outer cylinder 35A as well as with inner cylinder 35B at two parts orthogonal to an outer periphery of inner cylinder 35B. Outer and inner cylinders 35A, 35B are thus coupled to each other so as to move with each other in the rotating direction and to expand and contract vertically.

A die for making second drive member 35 including connecting part 35C having the gimbal structure can be manufactured easily at low cost. The number of narrow-bridge rings 39 for the gimbal structure is not limited to one, and a plurality of narrow-bridge rings 39 may be arranged concentrically in accordance with an expanding/contracting condition.

The elements laminated as described above are integrated into the multi-operational electronic device of the present embodiment by covering all those elements with inverted-U-shaped metal cover 40 and crimping metal cover 40.

Click spring 41 made of resilient sheet metal is fixed to the lower surface of first casing 21 to provide a click feel during rotation of second drive member 35 by engaging with radial irregularities 35D provided at outer cylinder 35A.

A description is provided next of an operation of the above-constructed multi-operational electronic device of the present embodiment.

Figure 5:
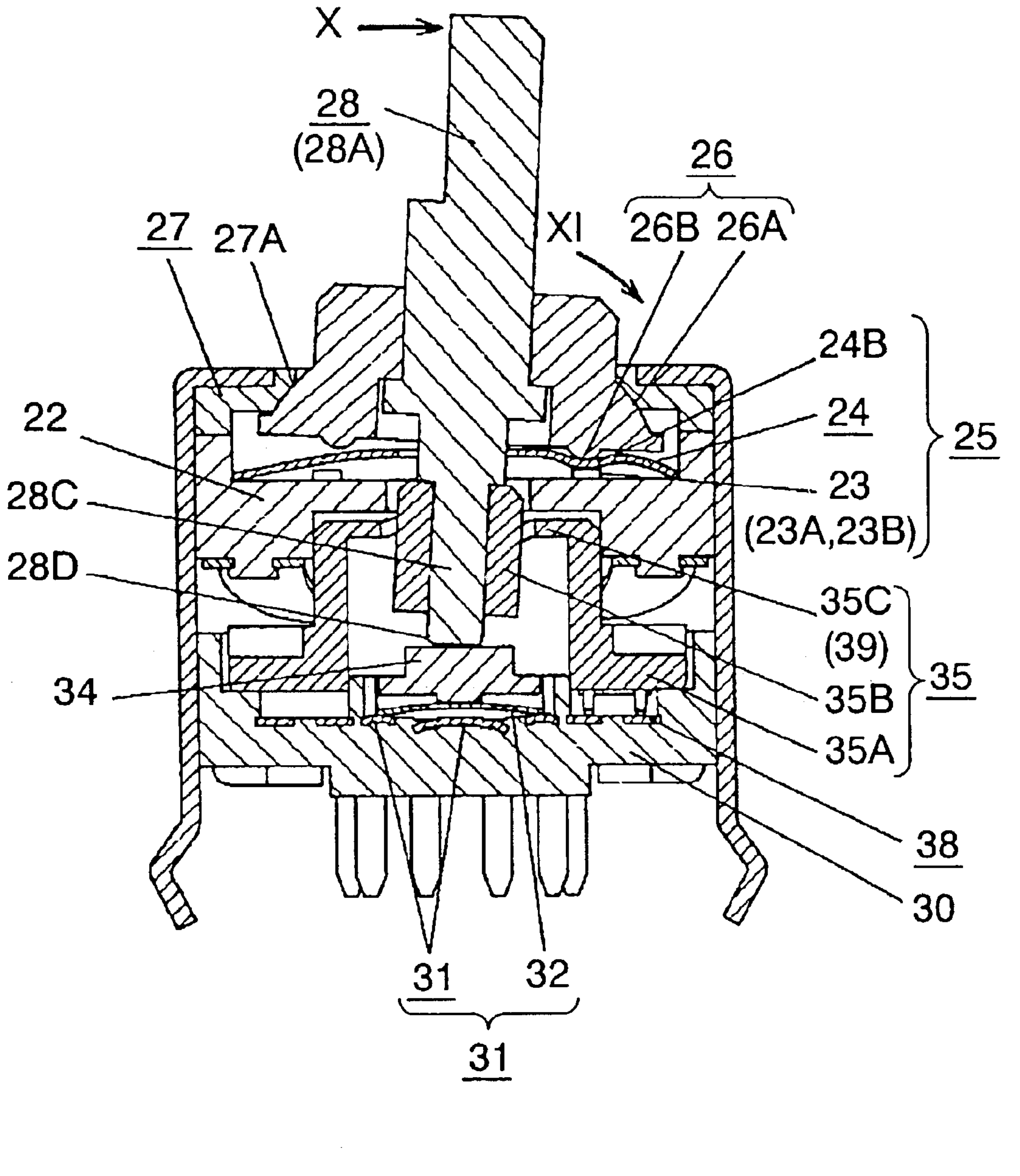
FIG. 5 is a sectional front view illustrating an operating lever of the multi-operational electronic device that is tilted by application of lateral pushing force in accordance with the embodiment.

When operating lever 28A, located at an upper part of operating shaft 28 projecting upward from first drive member 26, is tilted from its neutral position in a direction indicated by arrow X in FIG. 1 by application of lateral pushing force, operating shaft 28 and first drive member 26 turn to the right as indicated by arrow XI in FIG. 5 on domelike part 26A contacting cover plate 27 in circular opening 27A.

Accordingly, ring-shaped projection 26B on the lower surface of first drive member 26 inclines, whereby part 24B of resilient movable contact 24 that is positioned in the tilting direction is pressed downward by this projection 26B, thus being resiliently turned inside out as shown in FIG. 5.

By being resiliently turned inside out, part 24B contacts first fixed contacts 23A, 23B positioned in the tilting direction on first contact board 22 disposed below resilient movable contact 24, thereby short-circuiting these fixed contacts 23A, 23B. Consequently, signals are sent out from the respective terminals of fixed contacts 23A, 23B.

On the other hand, narrow-bridge ring 39 of connecting part 35C having the gimbal structure that connects with inner cylinder 35B experiences a slight elastic deformation, whereby non-cylindrical part 28C of operating shaft 28 that is engaged in inner cylinder 35B of second drive member 35 moves in a direction opposite to the tilting direction of operating shaft 28. Consequently, lower end 28D of operating shaft 28 skids slightly in contact with push member 34.

When operating lever 28A of operating shaft 28 is released from the lateral pushing force, resilient movable contact 24 of first switch 25 that has part 24B resiliently turned inside out restores its original circular domelike shape by its own resilient restoring force, thereby pushing projection 26B of first drive member 26 back from beneath. Consequently, first drive member 26 and operating shaft 28 return to their respective original neutral positions.

Here, narrow-bridge ring 39 of second drive member 35 engaging with non-cylindrical part 28C of operating shaft 28 elastically restores its original shape, thus helping operating shaft 28 return to its neutral position.

As described above, tilting operating lever 28A of operating shaft 28 in the desired direction to resiliently turn the part of circular domelike resilient movable contact 24 inside out allows first switch 25 to send out the signal corresponding to the tilting direction of operating lever 28A from the corresponding terminal.

In other words, this first switch 25 has the reduced number of elements because first switch 25 has one resilient movable contact 24 for first fixed contacts 23, the number of which corresponds the number of tilting directions of operating lever 28A.

In cases where, for example, the number of tilting directions of operating lever 28A is limited, instead of being ring-shaped, projection 26B provided on the lower surface of first drive member 26 to turn the part of resilient movable contact 24 inside out by pressing that part may be constructed of discrete projections corresponding to the respective tilting directions. This can reduce malfunction further.

When operating lever 28A of operating shaft 28 is rotated while being held in the neutral position, first drive member 26 engaging with cylinder 28B of operating shaft 28 stays still, and second drive member 35 having inner cylinder 35B connected with non-cylindrical part 28C rotates.

In other words, outer cylinder 35A coupled to inner cylinder 35B of second drive member 35 through connecting part 35C having the gimbal structure rotates. Accordingly, rotary resilient contact 37 held at the lower surface of outer cylinder 35A slides resiliently on circular toothed-comb-shaped second fixed contact 36 provided on the inner bottom surface of second casing 29, as shown in FIG. 3, thereby generating the pulse signal (rotary signal). Here, nibs 41A (see FIG. 2) of click spring 41 rotate in resilient contact with radial irregularities 35D of outer cylinder 35A, thereby providing the click feel synchronizing with the pulse signal.

The pulse signal generated is sent out from the terminal connected to second fixed contact 36.

During the rotation, non-cylindrical part 28C of operating shaft 28 and inner cylinder 35B of second drive member 35 do not rattle because non-cylindrical part 28C and inner cylinder 35B are fixed to each other by press fitting. Although narrow-bridge ring 39 of connecting part 35C having the gimbal structure undergoes elastic deformation to some extent during the rotation, this does not give a feel of backlash to a hand of a user who rotates operating lever 28A.

In the above description, rotary resilient contact 37 held by outer cylinder 35A of second drive member 35 slides resiliently on circular toothed-comb-shaped second fixed contact 36 of second casing 29 to generate the pulse signal. However, the movable contact may exchange functions with the fixed contact so that the circular toothed-comb-shaped fixed contact becomes a rotary circular toothed-comb-shaped movable contact, while the movable contact becomes a resilient fixed contact to slide resiliently on the rotary movable contact.

In the above description, the rotary encoder, which has high general versatility, for example, in adjustment of an output of an electronic apparatus, is used as the rotary signal generator. However, the rotary signal generator may be a rotary variable resistor, the resistance of which varies with rotation.

Figure 6:
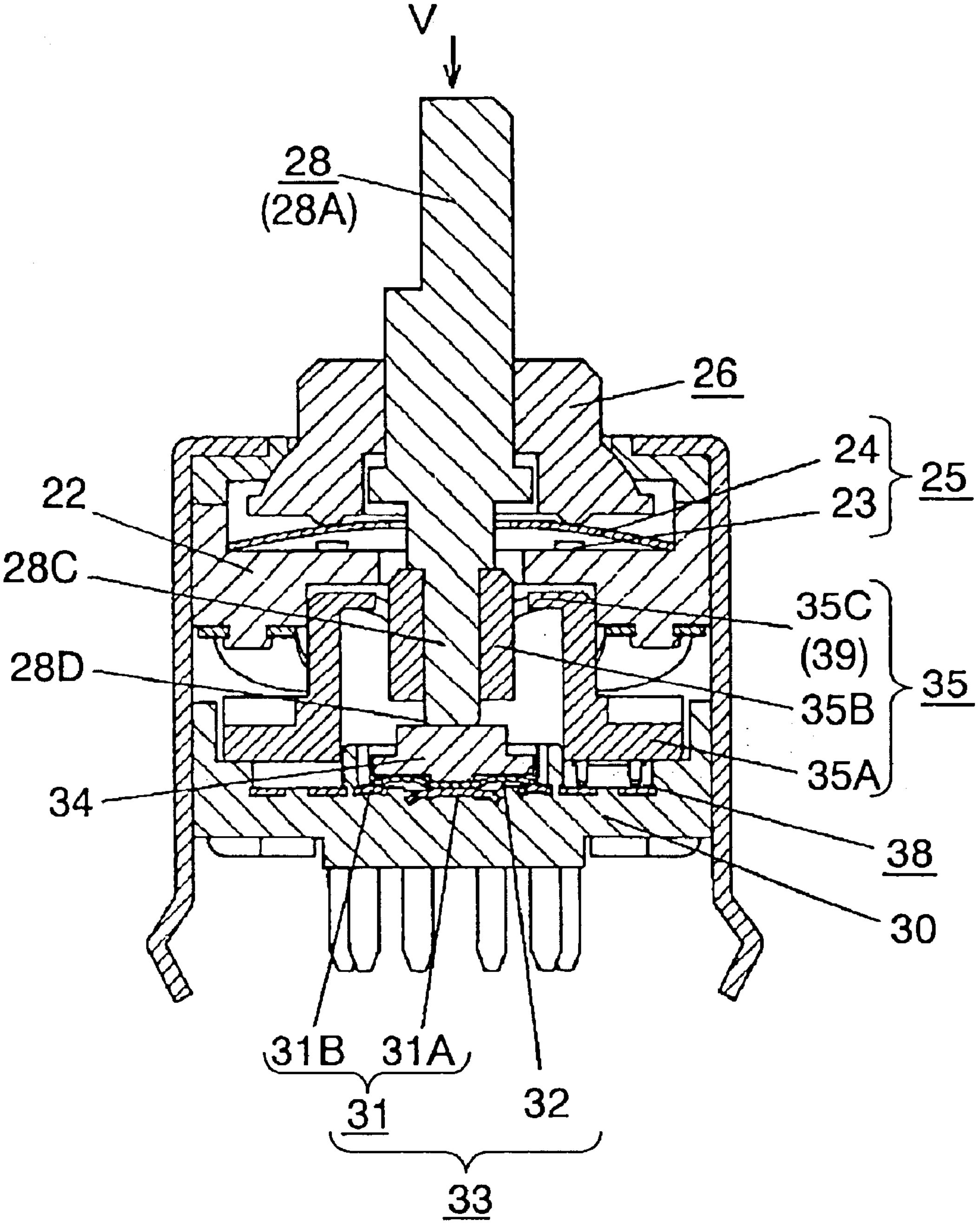
FIG. 6 is a sectional front view illustrating the operating lever pressed by application of downward pushing force in accordance with the embodiment.

When operating lever 28A of operating shaft 28 is pressed downward as indicated by arrow V in FIG. 1 by application of downward pushing force, only operating shaft 28 descends perpendicularly as shown in FIG. 6 with first drive member 26 staying still, whereby lower end 28D of operating shaft 28 presses the central portion of the upper surface of circular domelike movable contact 32 of central switch 33 via push member 34. Consequently, the central portion of movable contact 32 is resiliently turned inside out, thus contacting central fixed contact 31A positioned below the central portion, as shown in FIG. 6.

In other words, outer fixed contact 31B contacting the border of the lower surface of movable contact 32 and central fixed contact 31A are short-circuited, whereby central switch 33 is brought to the ON state, and a corresponding signal is sent out from the terminal connected to fixed contact 31.

During this pressing operation, narrow-bridge ring 39 of connecting part 35C having the gimbal structure that connects with outer cylinder 35A experiences a slight elastic deformation, whereby inner cylinder 35B of second drive member 35 that is fixed to non-cylindrical part 28C of operating shaft 28 descends with operating shaft 28.

When operating lever 28A is released from the downward pushing force, movable contact 32 resiliently turned inside out restores its original circular domelike shape by its own resilient restoring force, thereby pushing lower end 28D of operating shaft 28 back from beneath. Consequently, operating shaft 28 returns to its original position, as shown in FIG. 1.

Here, narrow-bridge ring 39 of second drive member 35 engaging with non-cylindrical part 28C of operating shaft 28 elastically restores its original shape, thus helping operating shaft 28 return to its original position.

According to the present embodiment, the rotation of operating lever 28A causes no backlash because outer cylinder 35A holding rotary resilient contact 37 of the rotary encoder is coupled to inner cylinder 35B, fixed to operating shaft 28, through connecting part 35C having the gimbal structure so as to move with inner cylinder 35B in the rotating direction and to expand. and contract vertically.

Since first switch 25 uses only one resilient movable contact 24 for the plurality of first fixed contacts 23, the multi-operational electronic device has the reduced number of elements as a whole and is hence inexpensive.

In the above description, connecting part 35C connecting outer and inner cylinders 35A, 35B has the gimbal structure in which narrow-bridge ring 39 connects with outer cylinder 35A at the two parts orthogonal to outer cylinder 35A as well as with inner cylinder 35B at the two parts orthogonal to inner cylinder 35B. However, as shown in FIG. 7A illustrating another multi-operational electronic device, connecting part 42C may be formed of a curved thin band to connect outer cylinder 42A and inner cylinder 42B of second drive member 42.

Figure 7C:
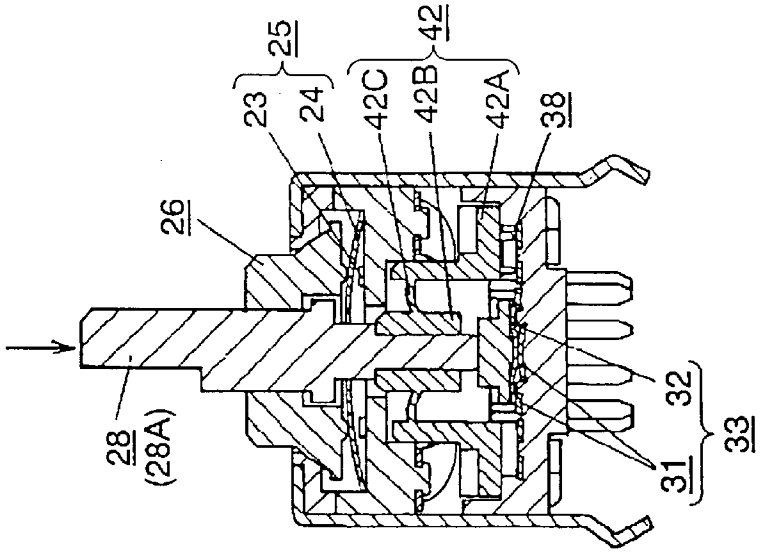
FIG. 7C is a sectional front view illustrating the operating lever of another multi-operational electronic device that is pressed by application of the downward pushing force in accordance with the embodiment.
Figure 7B:
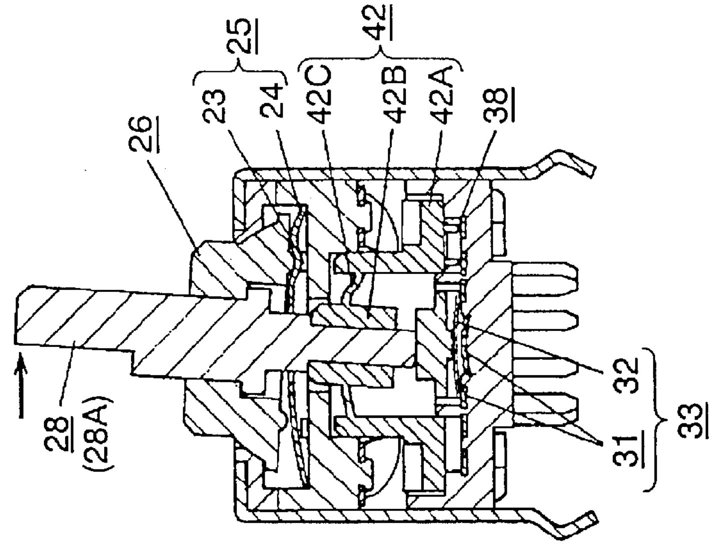
FIG. 7B is a sectional front view illustrating an operating lever of another multi-operational electronic device that is tilted by application of the lateral pushing force in accordance with the embodiment.
Figure 7A:
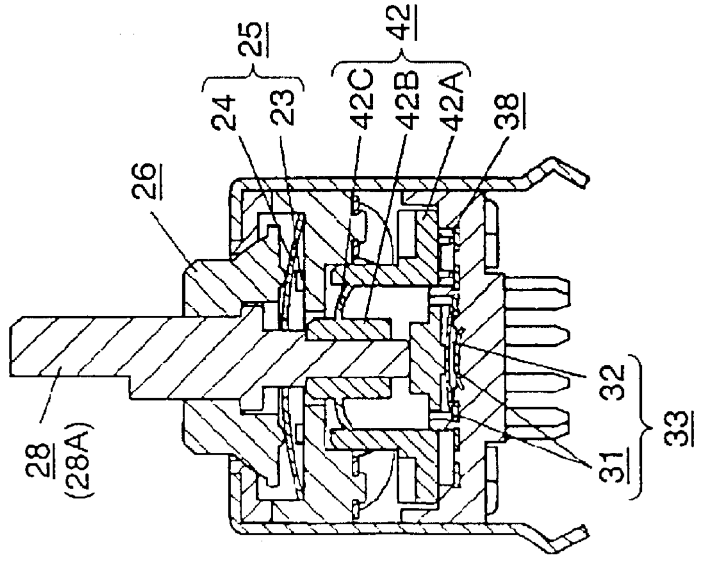
FIG. 7A is a sectional front view of another multi-operational electronic device in accordance with the embodiment.
Figure 8:
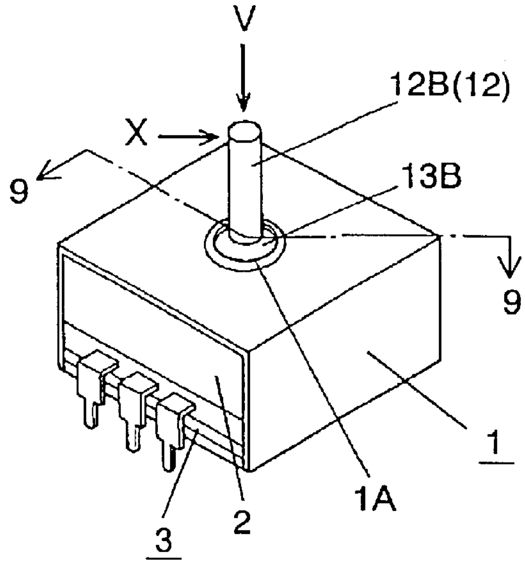
FIG. 8 PRIOR ART
FIG. 8 is a perspective view of a conventional multi-operational electronic device with push switches.
Figure 9:
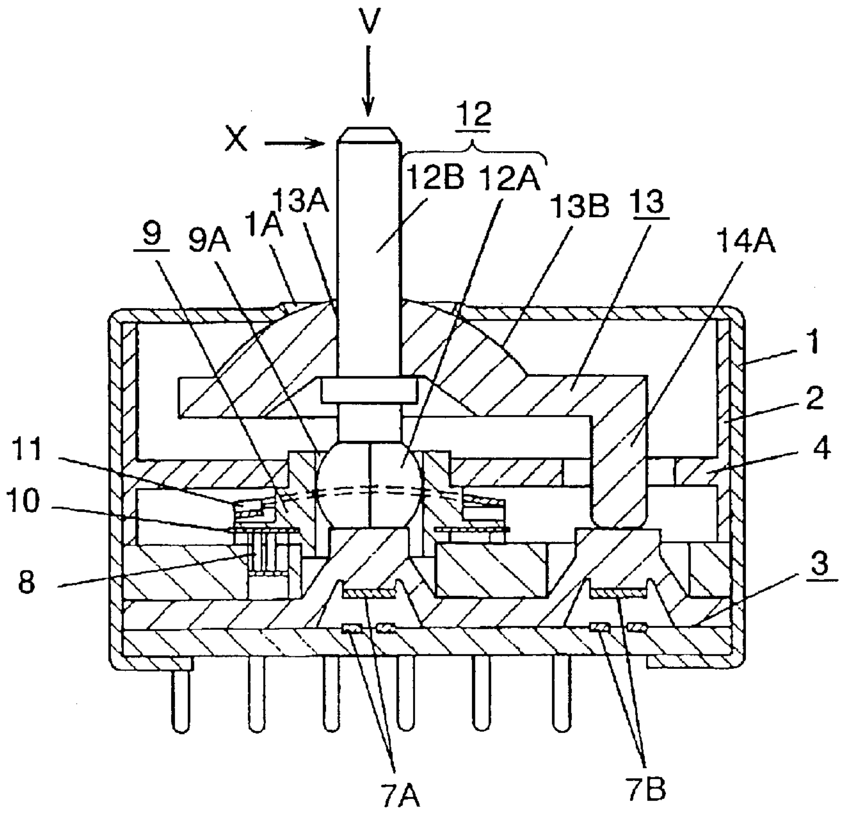
FIG. 9 PRIOR ART
FIG. 9 is a sectional view taken along line 9—9 in FIG. 8.
Figure 10:
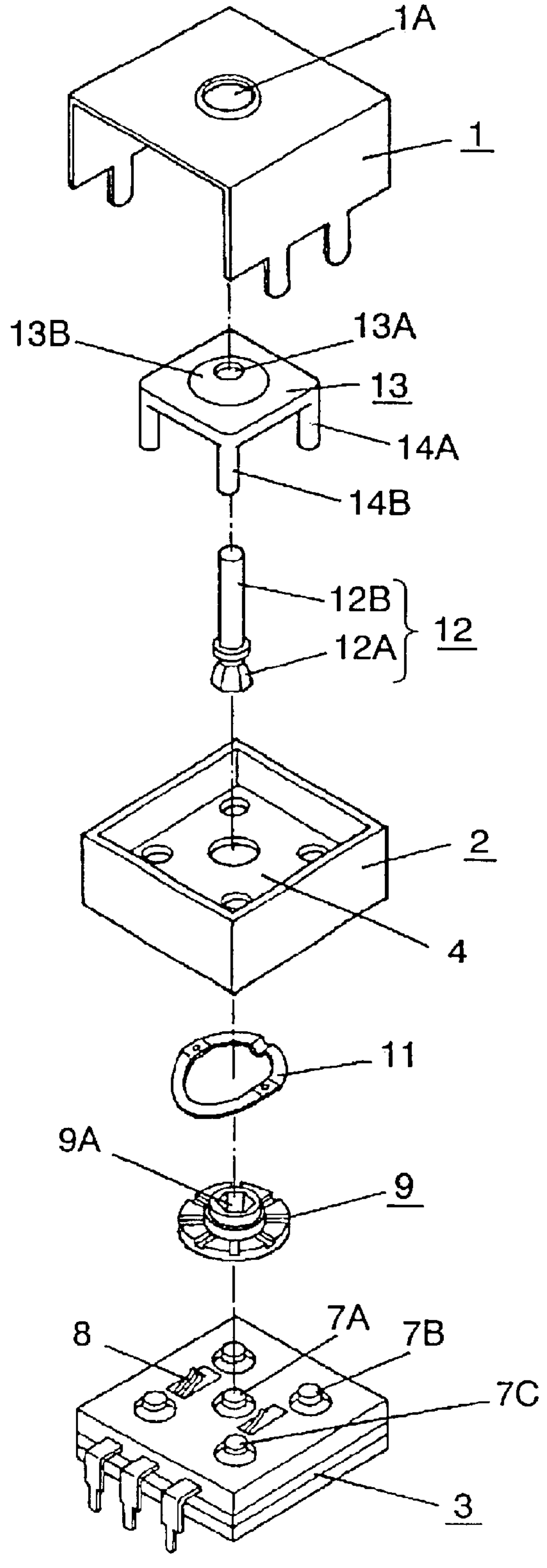
FIG. 10 PRIOR ART
FIG. 10 is an exploded perspective view of the conventional multi-operational electronic device.
Figure 11:
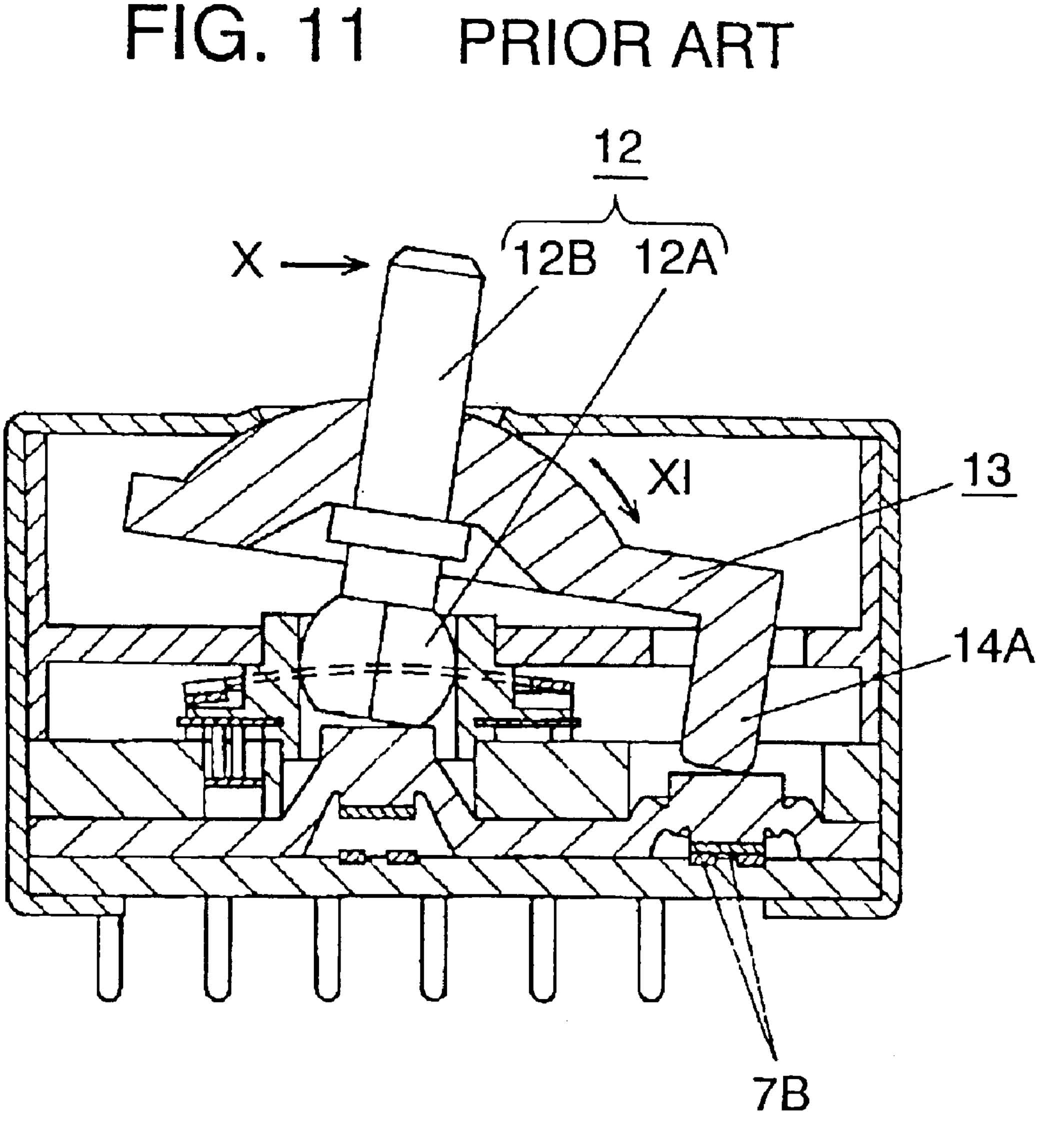
FIG. 11 PRIOR ART
FIG. 11 is a sectional front view illustrating an operating lever of the conventional multi-operational electronic device that is tilted by application of the lateral pushing force.

When operating lever 28A of operating shaft 28 is tilted as shown in FIG. 7B and pressed as shown in FIG. 7C, because of such a structure, connecting part 42C in the form of the thin band experiences elastic deformation, thereby effecting respective operations of first switch 25 and central switch 33.

By having the form of the curved thin band, connecting part 42C can also reduce angular displacement between outer and inner cylinders 42A, 42B that results from deformation of connecting part 42C during rotation of operating lever 28A.

According to the present invention described above, the first switch operates when the operating lever is tilted, the rotary signal generator operates when the operating lever is rotated, and the central switch operates when the operating lever is pressed. Moreover, no backlash is caused when the rotary member is driven through the rotation of the operating lever for generation of the electric signal. Further, the multi-operational electronic device uses, as a whole, the reduced number of elements and can thus be inexpensive.

What is claimed is:

1. A multi-operational electronic device comprising:

(a) a first switch comprising:

first fixed contacts arranged in a circle at established angular intervals on an inner surface of a first contact board; and a resilient movable contact having a circular domelike shape large enough to cover all of the first fixed contacts across an established space and a through-hole in a center of the resilient movable contact, the resilient movable contact made of resilient sheet metal;

(b) a first casing including a circular opening in a center of an upper surface of the first casing;

(c) a first drive member stored in the first casing, the first drive member including: a turnable and tiltable domelike part extending along a border of an upper surface of the first drive member and contacting the first casing about the circular opening; a central hole through which an operating shaft including an operating lever at an upper part of the operating shaft is engaged to move vertically and rotate; and a specified projection provided on a lower surface of the first drive member and contacting an upper surface of the resilient movable contact in a position corresponding to the first fixed contacts in the first casing;

(d) a second casing placed below the first casing concentrically with the first casing and coupled to the first casing through a through-hole of the first casing, the second casing including: a central switch, which operates when pressed against a central part of an inner surface of a second contact board serving as a bottom of the second casing; and a second fixed contact extending along a circle surrounding the central switch; and (e) a second drive member stored in the second casing, the second drive member including: a rotatable outer cylinder vertically supported and having, on a lower surface of the outer cylinder, a rotary movable contact, which engages with the second fixed contact to generate an electric signal for a rotary signal generator; an inner cylinder fixed to a lower part of the operating shaft passing through the through-hole of the resilient movable contact of the first switch; and a connecting part connecting the outer and inner cylinders to allow the outer and inner cylinders to move with each other in a rotating direction and to expand and contract vertically, the outer and inner cylinders and the connecting part being integrally formed of elastic resin.

2. The multi-operational electronic device of claim 1, wherein the connecting part of the second drive member has a gimbal structure in which a specified narrow-bridge ring is concentric with the outer and inner cylinders and connects the outer and inner cylinders.

3. The multi-operational electronic device of claim 1, wherein the connecting part of the second drive member is formed of a curved thin band to connect the outer and inner cylinders.

4. The multi-operational electronic device of claim 1, wherein the rotary signal generator is a rotary encoder.

5. The multi-operational electronic device of claim 1, wherein a click spring and radial irregularities are provided at a lower surface of the first casing and the second drive member, respectively, for providing a click feel during rotation of the operating lever.

* * * * *